United States Patent [19]

Kemler et al.

[11] 4,451,708
[45] May 29, 1984

[54] SPARE SUBSCRIBER TERMINAL APPARATUS

[75] Inventors: Marc Kemler; Christian Coppens; Michel Billot, all of Velizy, France

[73] Assignee: Compagnie Industrielle des Telecommunications Cit-Alcatel, Paris, France

[21] Appl. No.: 365,851

[22] Filed: Apr. 5, 1982

[30] Foreign Application Priority Data

Apr. 3, 1981 [FR] France ................... 81 06811

[51] Int. Cl.³ ............................................. H04Q 1/20
[52] U.S. Cl. ........................ 179/98; 179/175.2 C; 179/175.3 S; 370/16
[58] Field of Search ............... 179/175.2 R, 175.2 C, 179/175.3 R, 175.3 S, 91 R, 98, 18 EA, 18 B; 370/16, 13

[56] References Cited

PUBLICATIONS

JP-A-55-115786 (Fujitsu K.K.) Patents Abstracts of Japan, vol. No. 170, Nov. 22, 1980–p. 652 E 35.
Supplement to Electrical Communication, vol. 55, No. 2, 1980 (London) Network Terminal and Control Elements, pp. 24, 30, page 25–right col. line 40 to page 26 left col. line 30.

Primary Examiner—Stafford D. Schreyer
Attorney, Agent, or Firm—Sughrue, Mion, Zinn, Macpeak and Seas

[57] ABSTRACT

Subscribers (Ab1 to Ab8) in a telecommunications system are normally connected via respective subscriber lines (L1 to L8) to respective subscriber terminals (T1 to T8). Automatic subscriber line test means are connected via a subscriber line test bus (BL) and various relay contacts (r1 to r8 and re1 to re8) to the subscriber lines for testing purposes. Eight subscriber terminals (T1 to T8) populate a single circuit card, thereby constituting a terminal unit (TU1 to TUp). A group of terminal units is associated with a spare terminal unit (TUS). When a faulty terminal unit is detected, it is taken out of service and the spare terminal unit takes over. This is done by switching the subscriber lines connected to the faulty terminal unit over to the test bus. The spare terminal unit is likewise connected to the test bus. To enable the test means to continue testing the remainder of the telecommunications system without being interrupted by the emergency connection via the test bus, isolator means (I) are provided.

4 Claims, 3 Drawing Figures

SPARE SUBSCRIBER TERMINAL APPARATUS

The invention relates to spare subscriber terminal apparatus for use in a telecommunications system where subscriber terminals are connected to respective subscriber lines via switching means, eg. relay contacts, suitable for diverting the lines to subscriber line test means.

BACKGROUND OF THE INVENTION

The invention is applicable, in particular, to telephone exchanges. In such a case, the subscriber terminal is the equipment in the exchange which is individual to any one telephone line. The equipment includes power supply means, ringing means, line matching means, supervisory means, and means for diverting the line to a tester. The terminal is connected to its corresponding subscriber line via a main distribution frame (MDF) and to the common equipment of the exchange via an intermediate distribution frame (IDF), the precise details of which depend on the type of exchange in question. The subscriber terminals are generally arranged in groups of four or eight to a circuit card.

A fault in the card can deprive one or more of the lines connected to the card of telecommunications service. However, since the overall cost of all the subscriber terminal cards is high, they are not duplicated. They are tested daily and if a fault is detected, human intervention is required.

Nowadays, users are demanding practically uninterrupted service, while at the same time, it is becoming uneconomic to provide round-the clock servicing for an exchange. One way of satisfying both requirements, is to include a spare subscriber terminal capable of taking over from a faulty subscriber terminal among several. The problem becomes one firstly of detecting a fault and instructing switchover from the faulty terminal to a spare, and secondly of providing adequate switching means and output points on the subscriber terminal circuit cards.

Subscriber circuit cards are already crowded, and reducing the number of subscriber terminals per card or using means additional to a card would be prohibitively expensive. Preferred embodiments of the present invention mitigate these problems.

SUMMARY OF THE INVENTION

The present invention provides spare subscriber terminal apparatus for use in a telecommunications system including: a plurality of subscriber lines; subscriber terminals for interfacing respective subscriber lines to the rest of the system; subscriber line test means; first switching means associated with each subscriber line to connect it selectively to its corresponding subscriber terminal or to said subscriber line test means; subscriber terminal test means; and second switching means associated with each subscriber terminal to connect it selectively to its corresponding subscriber line or to said subscriber terminal test means; wherein the subscriber terminals are organised in terminal units, each of which comprises a plurality of subscriber terminals; wherein the subscriber line test means is provided with a subscriber line test bus; and wherein the spare subscriber terminal apparatus comprises a spare terminal unit and a test means isolator, said isolator including third switching means for selectively connecting a portion of said subscriber line test bus having sufficient connections for parallel connection to all the subscriber lines of any one terminal unit either to the remainder of said bus, and hence to said subscriber line test means, or else to the subscriber terminals of the spare terminal unit, whereby said portion of the subscriber line test bus may be switched to connect the spare terminal unit to the subscriber lines of a faulty terminal unit while isolating the subscriber line test means from said portion of the test bus, said test means isolator further including switching means to isolate said subscriber terminal test means from the terminal units corresponding to said portion of the subscriber line test bus while said portion is being used to connect the spare terminal unit to subscriber lines.

BRIEF DESCRIPTION OF THE DRAWINGS

An embodiment of the invention is described by way of example with reference to the accompanying drawings in which.

DETAILED DESCRIPTION OF THE INVENTION

Figure 1:
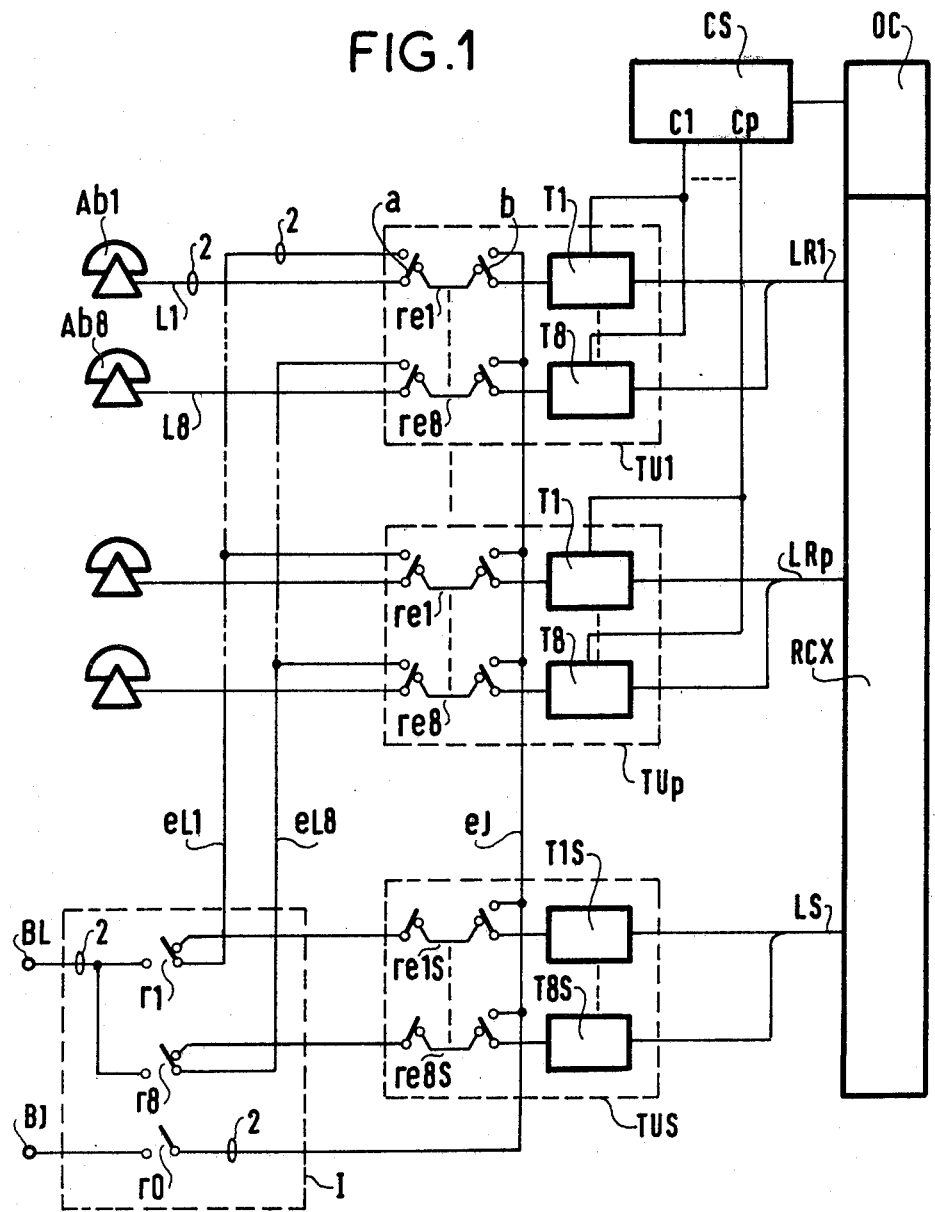
FIG. 1 is a block diagram of spare subscriber terminal apparatus in accordance with the invention.

The embodiment of the invention described with reference to the figures relates to a telephone exchange in which subscriber line terminals are grouped into terminal units TU1 to TUp sharing various means in common, eg. supervisory means and connections to test means. Only those parts of the exchange which have a bearing on understanding the invention are shown in FIG. 1:

A set of control means OC;

A switching network RCX;

The terminal units TU1 to TUp, and a spare terminal unit TUS;

A control circuit CS constituted by a known marker device for controlling switchover to the spare terminal unit; and A test means isolator circuit I.

The terminal units TU1 and TUp and TUS are connected to the switching network RCX by respective lines LR1 to LRp and LS. In a time division exchange, the lines are multiplex lines and may be common to several terminal units.

Figure 2:
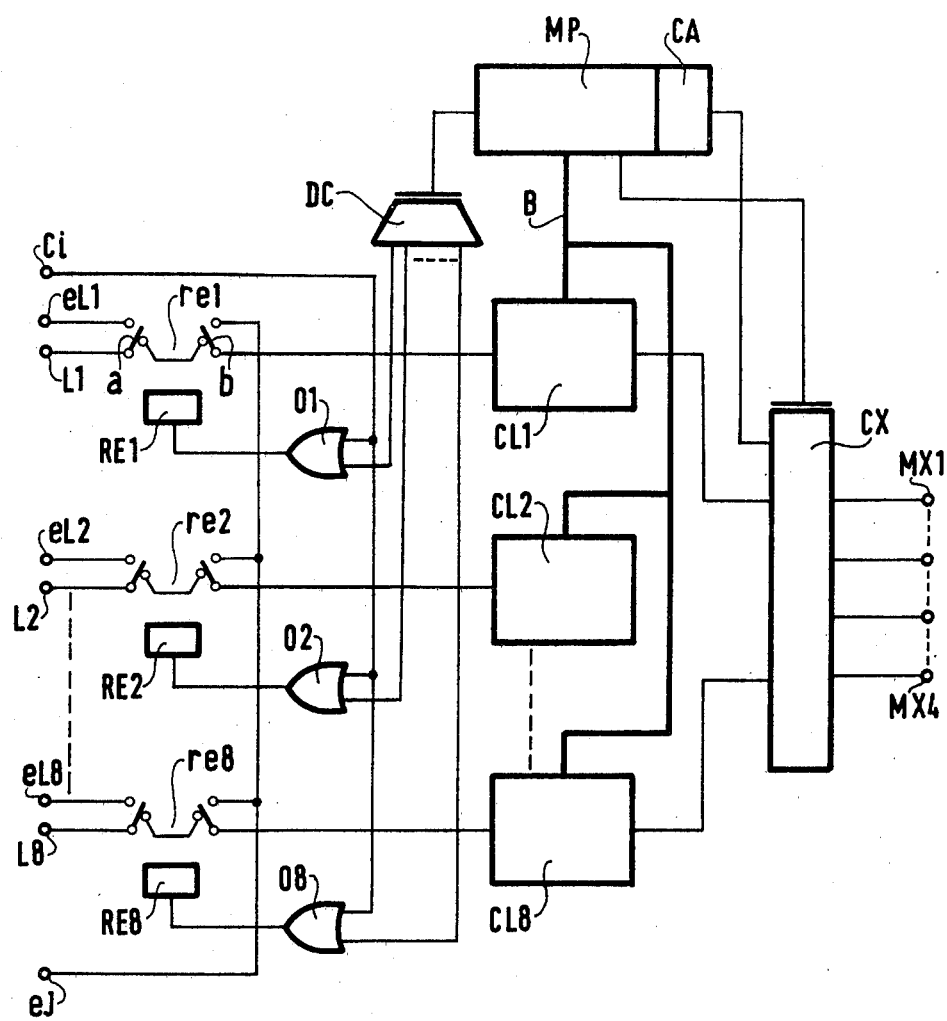
FIG. 2 is a block diagram of one type of terminal unit as shown in FIG. 1.

Each terminal unit comprises eight subscriber terminals T1 to T8, each of which is connected to a corresponding subscriber Ab1 to Ab8 via respective subscriber lines L1 to L8 and two pairs of relay contacts re1 to re8 belonging to respective test connection relays (RE1 to RE8, see FIG. 2). A first of said pairs of contacts a serves to divert the subscriber line to an automatic line tester (REL, see FIG. 3), via test connections eL1 to eL8 forming an extension of a subscriber line test bus BL. Likewise, the other pair of contacts b serves to connect the subscriber terminal to subscriber terminal test means (an automatic junctor tester REJ see FIG. 3) via a test connection eJ forming an extension to a junctor test bus BJ.

The spare terminal units TUS is identical to the other terminal unit and comprises eight identical spare terminals T1S to T8S. In the event of a fault in one of the normal subscriber terminals, the set of subscriber lines being served by the terminal unit including the faulty terminal is switched over to be served by the spare terminal unit. To do this, the faulty terminal unit is switched to the test position such that each of its subscriber lines L1 to L8 is connected to a respective one of the subscriber line test bus connections eL1 to eL8, while at the same time the junctor test bus BJ is switched to each of the subscriber terminals T1 to T8 via the junctor test bus connection eJ.

The connections eL1 to eL8 and eJ to the test buses are multipled over all the terminal units TU1 to TUp, and are likewise connected to corresponding points of the spare terminal unit TUS.

A given terminal unit is switched over to the test bus connections by energising all its test relays RE1 to RE8 under the control of the control circuit CS. The identity of the faulty unit is transmitted to the control circuit CS by the control means OC. The control circuit CS has a control link C1 to Cp to each of the terminal units TU1 to TUp. These control links must be capable of energising all the test relays of a faulty terminal unit card TU regardless of the fault, i.e. including a power supply fault. The control links must therefore supply the power required by all eight relays.

The spare terminal unit TUS is identical to the other terminal units TU1 to TUp and is also connected to the junctor test bus BJ so that its terminals can be tested.

Further, if the line test bus BL were to be permanently connected to the test bus connections eL1 to eL8, in the event of a switchover to the spare terminal unit the automatic line tester REL would no longer be usable. This would not be acceptable in an exchange where such a line tester might be required to test up to 1000 lines. Nor is it acceptable to simply disconnect the subscribers using the spare terminal unit for the duration of the daily line testing operations.

Thus, the total number of subscribers serviced by a given automatic subscriber line tester is subdivided into a number of groups, and the line test bus BL and the junctor test bus BJ are connected to each group via an isolation circuit I. Thus, when subscribers have been switched to the spare terminal unit in any one group, testing may continue unaffected in the other groups. Further, testing a single group takes relatively little time, and it may therefore be acceptable to disconnect the subscribers using the spare terminal unit for the duration of tests to their own group. This may be done all in one run when all of the terminal units in the group are tested, or else it may be done in a succession of short runs while each individual terminal unit or even each individual terminal in the group is tested on its own.

The isolator circuit I comprises at least one isolator relay having a pair of on/off contracts r0 on the junctor test bus BJ, and a pair of changeover contacts r1 to r8 on each of the subscriber line test bus connections eL1 to eL8. The contacts r1 to r8 are connected as follows:

The moving blades are connected to the subscriber line test bus connections eL1 to eL8 respectively; the rest fixed contacts are connected to respective terminals of the spare terminal unit TUS; and the working fixed contacts are commoned to a single pair constituting the subscriber line test bus BL.

Thus, to test subscriber lines in any one group, it is necessary to begin by energising the relay in the isolator circuit I attributed to the group in question.

FIG. 2 is a block diagram of a particular embodiment of a terminal unit which is controlled by a microprocessor MP and which is connected to a time division exchange. The terminal unit comprises the following components:

(A) Components individual to each terminal:
Test connection relays RE1 to RE8;
Line circuits CL1 to CL8 performing both the conventional functions of a junctor, eg. using a circuit known under the name BORSHT, and the functions of a codec type of conversion circuit;
OR gates 01 to 08 to control the test relays: overall control from the control circuit CS (FIG. 1) via an inlet Ci or individual test control by the microprocessor MP, e.g using a terminal number decoder DC. Naturally, the OR gates 01 to 08 must pass relay energising current, and may therefore require an amplifier for amplifying signals from the decoder DC.

(B) Components common to all the subscriber terminals in the unit:
A switching matrix CX for connecting the line circuits to four multiplex lines MX1 to MX4; and the controlling microprocessor MP.

The line circuits CL1 to CL8 are connected to the microprocessor bus B (data bus, address bus and control bus). The matrix CX is also controlled by microprocessor MP.

To control the terminals the matrix and the test relays, the microprocessor MP communicates with the exchange control means OC (FIG. 1) via a signalling channel using one of the time slots of the multiplex lines. To do this, the microprocessor is connected to one of the inputs to the matrix CX via an access circuit CA.

The access circuit CA is, for example, a known commercially avaiable circuit for supervising the interchange of messages over the signalling channel using the procedure known under the initials "HDLC". Such message interchange between computers on a multiplex link is described, in particular, in French Pat. No. 79 05971.

Figure 3:
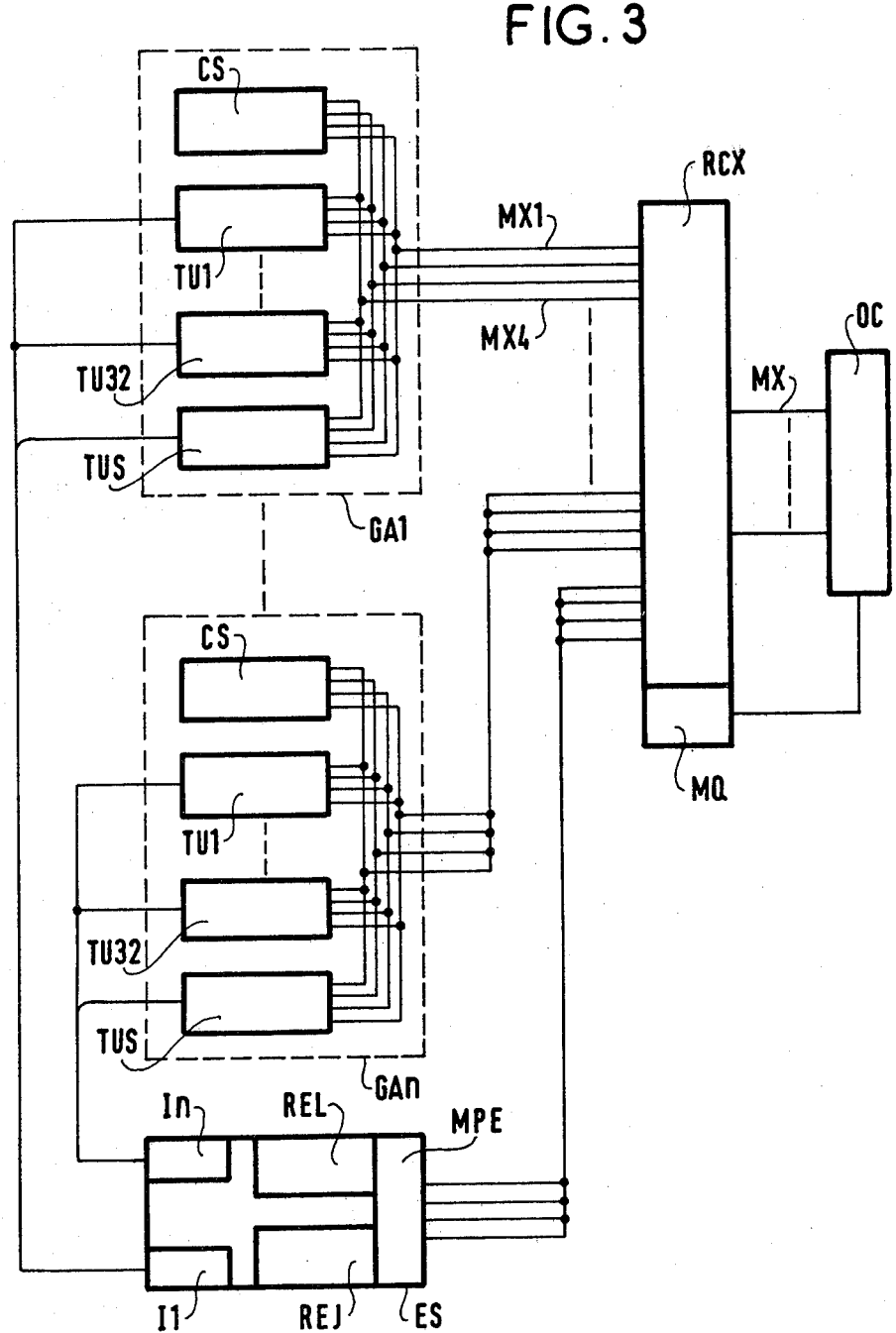
FIG. 3 is a block diagram of equipment in a time division exchange in which the invention is applied.

FIG. 3 is a block diagram showing connections between a single set of testers ES and a plurality of groups of terminal units GA1 to GAn.

The testers ES comprise the automatic subscriber line tester REL and the automatic junctor tester REJ both under the control of a microprocessor MPE. The set of testers ES is connected to each group of terminal units GA via respective isolator circuits I1 to In.

Testing is performed at the request of the exchange control means OC which is connected to the microprocessor MPE by a signalling channel conveyed via multiplex lines MX connected to the switching network RCX in a manner similar to that used to convey signals to the microprocessors in the terminal units.

The example shown is not a limiting example, but shows a preferred application of the invention concerning the localisation of the spare circuits:

The control circuit CS and the spare terminal unit TUS belonging to a group of terminal units are situated in the same rack (or one of the same racks) as the cards of the terminal units TU1 to TUp; and The isolator circuits I1 to In are situated in the same rack as the set of testers ES, with the isolator relays being controlled by the microprocessor MPE.

While this solution requires extra connections between the set of testers ES and the groups of terminal units GA, it helps to avoid interaction between switching programs and testing programs.

The control circuit CS is preferably likewise controlled by a microprocessor connected to the exchange control means via the same signalling channel as the microprocessors in the terminal units of the same group. This provides identical means for controlling all the microprocessors in the exchange.

In this application, switching over to the spare terminal unit, and the effects on testing occur as follows:

The decision to switch over to the spare terminal unit is taken by the exchange control means OC: one of the terminal units TU is detected as being unserviceable following the detection of a fault by means for localising breakdowns or for maintenance, by the junctor tester REJ, or by tests performed on the terminals by the microprocessor MP on instructions from the exchange control means OC;

The exchange control means OC instruct the control circuit CS to switch over to the spare unit and inform it of the number of the unit to be taken out of service; and The exchange control means updates its programs as follows:

Its translation tables are changed so that it still "knows" where to find the eight subscribers concerned by the changeover; and The testing program is modified in that the automatic line tester REL must coordinate its testing of the group of terminal units GA effected by the changeover with the corresponding control circuit CS so that the changeover is restored to normal to release the subscriber line test bus for its normal function of testing subscriber lines.

We claim:

1. Spare subscriber terminal apparatus for use in a telecommunications system, including: a plurality of subscriber lines; subscriber terminals for interfacing respective subscriber lines to the rest of the system; subscriber line test means provided with a subscriber line test bus; subscriber terminal test means provided with a junctor test bus; a test relay associated with each subscriber terminal and having first switching means associated with each subscriber line to connect it selectively to its corresponding subscriber terminal or to said subscriber line test means, and second switching means associated with each subscriber terminal to connect it selectively to its corresponding subscriber line or said subscriber terminal test means; the subscriber terminals being organized in terminal units each of which comprises a plurality of subscriber terminals, and terminal units being organized in groups each of which comprises a plurality of terminal units; wherein the spare subscriber terminal apparatus comprises a spare terminal unit and a test means isolator per group, said isolator including third switching means for selectively connecting an extension of said subscriber line test bus having sufficient connections for parallel connection to all the subscriber lines of any one terminal unit either to said line test bus, and hence to said subscriber line test means, or else to the subscriber terminals of the spare terminal unit, whereby said extension of the subscriber line test bus may be switched to connect the spare terminal unit to the subscriber lines of a faulty terminal unit while isolating the subscriber line test bus from said extension of the line test bus, said test means isolator further including switching means to isolate said junctor test bus from an extension of the junctor test bus, said extension of said junctor test bus being connected to all the subscriber terminals of the terminal units, while said extension of the line test bus is being used to connect the spare terminal unit to subscriber lines.

2. Apparatus according to claim 1, wherein each group of terminal units further includes a control circuit which is independent of the subscriber terminals, said control circuit being provided with control links connecting it to respective ones of said terminal units, said links being arranged to simultaneously energize all the test relays of a terminal unit to switch the the subscribers associated with said terminal unit over to the spare terminal unit.

3. Apparatus according to claim 1 wherein said subscriber line test means comprises an automatic subscriber line tester, said subscriber terminal test means comprises an automatic junctor tester, said apparatus including control means, and each of the test means isolators belonging to respective one of the groups of terminal units, each of the isolator circuits being controlled successively by said control means for testing the groups.

4. Apparatus according to claim 1, whereby when the third switching means of any particular test means isolator is switched to connect the subscriber line test bus extension of a terminal unit to the spare terminal unit of the particular group, the subscriber line test bus remains connected to the subscriber line test bus extensions of remaining groups.

* * * * *